(12) United States Patent
Tinlin

(10) Patent No.: US 7,698,882 B1
(45) Date of Patent: Apr. 20, 2010

(54) COLLECTION DEVICE

(76) Inventor: Richard Tinlin, 213 E. Quarter Horse La., Camp Verde, AZ (US) 86322

(*) Notice: Subject to any disclaimer, the term of this patent is extended or adjusted under 35 U.S.C. 154(b) by 17 days.

(21) Appl. No.: 12/214,328

(22) Filed: Jun. 17, 2008

(51) Int. Cl.
*A01D 46/00* (2006.01)
*A63B 47/02* (2006.01)

(52) U.S. Cl. ..................... 56/328.1; 294/19.2

(58) Field of Classification Search ............... 56/328.1, 56/332, 400.01–400.03, 400.11; 294/19.2
See application file for complete search history.

(56) References Cited

U.S. PATENT DOCUMENTS

| | | | | |
|---|---|---|---|---|
| 721,196 A * | 2/1903 | Jeffreys | ...................... | 294/19.2 |
| 2,609,198 A * | 9/1952 | Armstrong | ................... | 473/133 |
| 2,736,157 A * | 2/1956 | Weathersby | ............... | 56/328.1 |
| 2,749,697 A * | 6/1956 | Poche | ........................ | 56/328.1 |
| 2,788,630 A * | 4/1957 | Nisbet | ........................ | 56/328.1 |
| 3,068,634 A * | 12/1962 | Robinson | ................... | 56/328.1 |
| 3,149,872 A * | 9/1964 | Ward | ........................ | 294/19.2 |
| 3,600,029 A * | 8/1971 | Nagel | ........................ | 294/19.2 |
| 3,604,190 A | 9/1971 | Wray | | |
| 3,982,781 A * | 9/1976 | Tucker et al. | .............. | 294/19.2 |
| 4,322,939 A * | 4/1982 | McDonald | ................. | 56/328.1 |
| 4,575,143 A * | 3/1986 | Nast | .......................... | 294/65.5 |
| 4,848,071 A * | 7/1989 | Laughlin | ................... | 56/328.1 |
| D323,831 S | 2/1992 | Hollis | | |
| 5,330,177 A * | 7/1994 | Rogge | ......................... | 473/386 |
| 5,503,394 A * | 4/1996 | Mauck et al. | ............... | 473/386 |
| 5,669,646 A * | 9/1997 | Fiocca et al. | .................. | 294/24 |
| 6,481,768 B1 * | 11/2002 | Fu | ............................ | 294/19.2 |
| 6,619,022 B2 * | 9/2003 | Edwards | .................... | 56/328.1 |
| 6,925,791 B2 * | 8/2005 | Herndon | ...................... | 56/333 |
| 7,229,365 B2 * | 6/2007 | Berry | ......................... | 473/386 |
| 2005/0242599 A1 * | 11/2005 | Demar et al. | ................. | 294/60 |

* cited by examiner

*Primary Examiner*—Thomas B Will
*Assistant Examiner*—Joan D Misa
(74) *Attorney, Agent, or Firm*—Gregory J. Nelson

(57) ABSTRACT

A harvesting device for nuts and similar small objects having a handle which receives a manually reciprocable push rod having a spreader on its lower end. Tubular collection chambers are secured to the handle. A continuous coil spring extends between the lower, open ends of the collection chambers. The spreader engages the coil spring within the interior area at the end of the handle. In use, downward pressure applied to the handle at the grip will cause the openings between the coils of the coil spring to separate sufficiently to allow objects on the ground to pass into the interior of the spring and into one of the collection chambers. The collection chambers are emptied by holding the device over a receptacle such as a bin with one hand and operating the push rod in a reciprocating or pumping motion causing the openings between the coils to open and close, facilitating rapid emptying of the collection chambers.

6 Claims, 1 Drawing Sheet

U.S. Patent  Apr. 20, 2010  US 7,698,882 B1
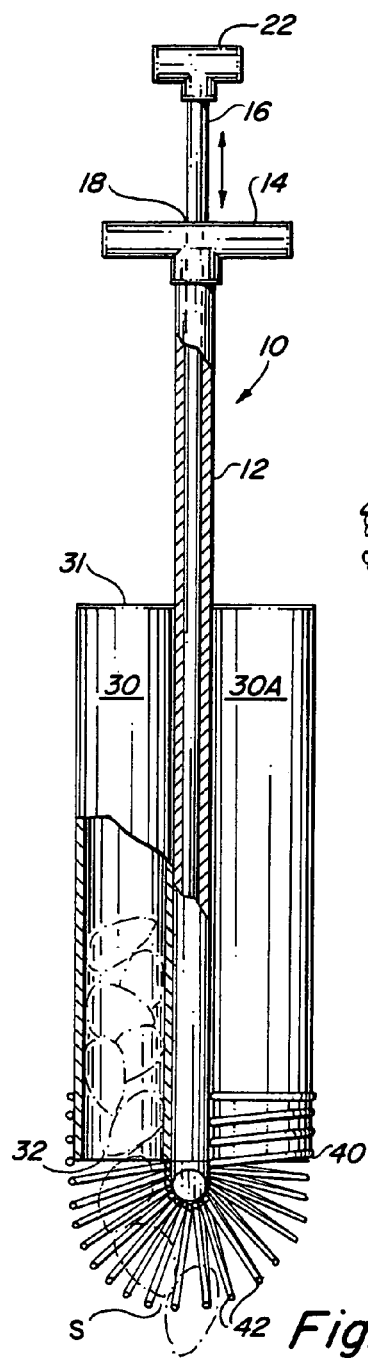
Fig. 1
Fig. 3
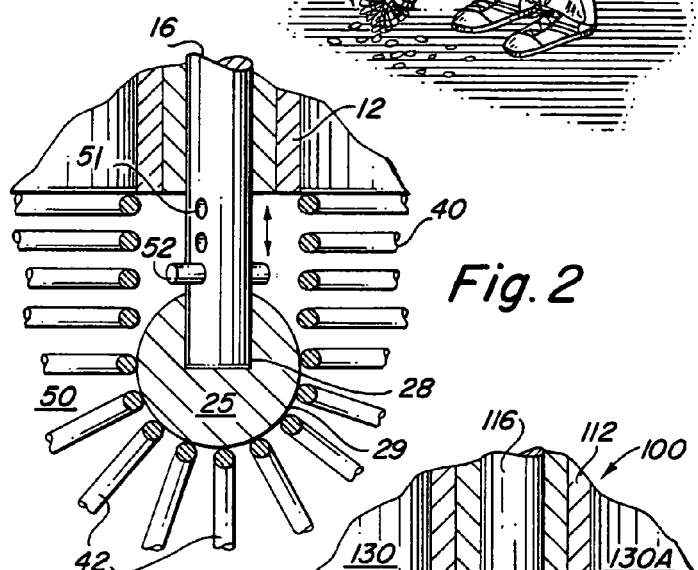
Fig. 2
Fig. 4

COLLECTION DEVICE

FIELD OF THE INVENTION

The present invention relates to a collection device and more particularly to a harvesting device for collecting, picking up and temporarily storing small objects, such as nuts, that have fallen to the ground.

BACKGROUND OF THE INVENTION

Nuts, such as pecans, are conventionally harvested by collecting those that have fallen to the ground. Those that are ripe and have not fallen are caused to fall to the ground by shaking or vibrating the tree. There are various types of equipment for shaking the trees. A tarpaulin, ground cover or, in some cases, a collection device, may be placed around the tree to catch the nuts as they fall from the tree.

In some cases, the fallen nuts are simply picked up by hand which is very labor intensive. Even if a ground cover or some type of collection equipment is used, it is still necessary to manually retrieve and collect some or all of the fallen nuts.

Accordingly, there exists the need for a reliable and efficient device which may be used to retrieve and collect nuts from the ground. Further, there exists the need for an improved device which is easy to use to collect nuts and which may be easily emptied. The device may be used by both commercial nut farmers as well as individuals who have only a small number of trees.

BRIEF SUMMARY OF THE INVENTION

Briefly, the present invention provides a collection device having substantial advantages over the prior art. The device of the present invention has an elongated handle which receives a reciprocal push rod. A pair of collection chambers are secured to the sides of the handle. A coil spring has its opposite ends secured to the lower ends of the collection chambers. The lower end of the push rod extends into the area at the end of the handle defined by the inner surface of the coil spring and has a coil extender which engages the coil spring. In use, the collection device is placed over the nuts to be picked up and is manually pushed or tamped downward into engagement with the nut causing the spring to expand sufficiently to allow nuts to pass between the coils into the interior of the coil spring. As the nuts are collected, they will migrate into one of the collection chambers. The device is emptied or dumped, usually at a receptacle such as a bin at a convenient location. The device is held over the bin with one hand on the grip of the handle and the user's other hand operates the push rod. Pressing downward on the push rod opens the spring coils allowing the nuts to be discharged from the collection chambers. A pumping motion imparted to the push rod will facilitate discharge of the nuts from the chambers by the rapid opening and closing of the coils of the spring. Releasing the downward pressure on the rod will allow the coil spring to close trapping the nuts within the coil spring and stopping the emptying flow from the device. Thus, emptying can be accomplished rapidly and with ease and convenience.

In an alternate embodiment, the position of the spreader can be adjusted to accommodate various sizes of nuts.

The device of the present invention provides a greater nut-holding capacity than conventional, manual picking devices and has the further advantage of extending the range of coverage and reducing the number of trips the user must make to a centrally located holding receptacle, thus greatly increasing the efficiency of the collecting operation.

BRIEF DESCRIPTION OF THE DRAWINGS

The above and other advantages and objects of the present invention will become more apparent when taken in conjunction with the following description, claims and drawings in which:

FIG. 1 is a front view of one embodiment of the nut harvesting device of the present invention partly broken away to better illustrate the details thereof;

FIG. 2 is an enlarged, detail view of the lower end of the nut harvesting device of the present invention shown in FIG. 1 with the push rod extended showing the coils separated to facilitate emptying the collection chambers;

FIG. 3 illustrates the use of the nut harvesting device of the present invention in which downward pressure on the handle grip will force nuts on the ground through the separations between the coils of the spring into the collection chambers; and FIG. 4 is a view of the lower end of an alternate embodiment of the nut harvesting device of the present invention having adjustment means to establish the coil separation space for different nut sizes.

DETAILED DESCRIPTION OF THE DRAWINGS

The device of the present invention is described with reference to its use as a nut harvester. However, it will be appreciated that the device may be used for picking up and collecting a variety of small objects. Turning now to the drawings, particular FIGS. 1 and 2, the device of the present invention is generally designated by the numeral 10 and has an hollow, tubular handle 12. The handle 12 can be any convenient length and may be suitably fabricated from plastic or metal. The length of the handle should be sufficient to allow comfortable use by an individual in a standing or upright position, as seen in FIG. 3.

The upper end of handle 12 has a T-shaped grip 14 which may be grasped by the user during the collection operation. A push rod 16 is reciprocal within the tubular handle, extending through an aperture 18 in the top of handgrip 14. The push rod is elongated and at its upper end receives a grip 22 which is shown as T-shaped but may be a knob or other type of grip. The overall length of the push rod 16 is greater than the length of the handle 12.

The lower, distal end of the push rod 16 carries a coil-spreader 25 which is shown as a spherical member having a recess 28 which receives the lower end of the push rod 16. The coil spreader may be attached to the rod by a fastener or an adhesive. The outer, curved surface 29 of the spreader engages the upper surface of spring 40 in the area where the spring is bent forming a U-shape. Thus, it will be seen that a user can manually reciprocate the longer push rod 16 using grip 22 causing the coil-extender 25 to reciprocate between a retracted position and an extended position, as shown by the arrow in FIG. 2.

A pair of collection chambers 30, 30A are secured to opposite sides of the handle 12. Preferably the collection chambers are tubular. The chambers each have an open, upper end 31 and an open lower end 32. The lower ends 32 of collection chambers 30, 30A extend to approximately the lower end of the handle. Coil spring 40 has a plurality of interconnected coils 42 which extend in a general U-shape configuration being secured at its opposite ends to the lower ends 32 of collection chambers 30, 30A. The coils may be engaged over the lower ends of the chambers 30, 30A as seen in FIG. 1. Spring 40 is shown as having circular coils but also may be other configurations such as rectangular. The spring 40 defines an interior passage 50 through which the nuts or other objects pass as they are collected and as the device is emptied.

As the push rod 16 is extended, the coil spreader 25 will engage the spring, causing the individual coils 42 to spread further apart as the push rod 16 extends. Thus, the user can operate the push rod to spread the coils 42 to empty the nuts by allowing them to pass between the coils into a collection bin.

To collect nuts, the device is placed, as seen in FIG. 3, with the coils 42 in the collection area A positioned immediately above the nut to be collected. The user will then manually apply pressure to push the device downwardly, using handle 14. The downward pressure will cause the nut to pass through, adjacent the individual coils or convolutions 42, into the interior passageway 50 of the coil spring and into one of the collection chambers 30, 30A. Bouncing or tamping the device gently on the ground will assist in the collection operations.

As nuts are collected, they will be transferred into one of the tubular collection chambers 30, 30A. Once the collection chambers are filled, the user will carry the collection device to a central collection location where the contents of the collection chambers will be emptied as described above. The nuts are emptied into a trailer or container which, when filled, will be transported to a location for further processing and packaging.

For small commercial users and residential users, the nut harvesting or picking device can be used to periodically collect nuts, as required, and the user can then carry the nuts to a location for use or sale as appropriate. Emptying is facilitated by rapid reciprocation of the push rod causing the coils to open and close so the collected nuts pass from the collection chamber and outward through the spaces or separations between the coils.

FIG. 4 illustrates an alternate embodiment of the device of the present invention designated by the numeral 100, having a push rod 116 which is reciprocal within tubular handle 112. An aperture in the cap 115 at the lower end of the handle 112 allows the push rod to project below the lower end of the handle. The lower end of the handle is provided with threads 124 which receive a lock nut 126 which may be axially adjusted along the threads to set a fixed coil spacing. The lower or distal end of the push rod 116 receives a spreader 125 which is shown as a cylindrical member having an internally threaded bore 128 in threaded engagement with the lower, threaded end of the push rod. Tubular collection chambers 130, 130A are oppositely secured to the handle. A continuous coil spring 140, having individual coils 142, extends between the bottom of the collection tubes, around the separator.

The lock nut 126 may be axially positioned along the threaded lower end of the push rod to establish the separation between the cap 115 and the spreader 125. Thus, the user can manually adjust the position of the lock nut and the coil spacing in accordance with the size of the nuts or other items to be harvested. The lock nut will retain the push rod in a position establishing the selected opening or separation between the coils. In this way, the user is not required to manually hold or maintain the push rod in a particular position, but can conveniently collect nuts up to a certain size established by the position of the lock nut 126.

Alternatively, the lower end of the push rod may be provided with a plurality of bores 51 in which a pin 52 may be selectively placed to position the push rod as shown in FIG. 3.

It will be obvious to those skilled in the art to make various changes, alterations and modifications to the invention described herein. To the extent such changes, alterations and modifications do not depart from the spirit and scope of the appended claims, they are intended to be encompassed therein.

I claim:

1. A manually operable collection device for picking up items varying in size from a surface comprising:
   (a) a handle having upper and lower ends;
   (b) a push rod reciprocable relative to said handle having an upper and lower end projecting beyond the ends of the handle, said push rod having a plurality of extended collection positions;
   (c) a first and second collection chamber secured to and extending along the handle having lower distal ends located adjacent the lower end of the handle;
   (d) a continuous spring having a plurality of coils, said spring having opposite ends being attached to and extending between the lower ends of the first and second collection chambers in a general U-shape having a collection area along the outer, curved section of the U-shape;
   (e) a spreader on the lower end of the push rod engaged with the spring for extending said spring into a selected one of said plurality of extended collection positions and for extending said spring when said push rod is manually extended to cause the coils of the coil spring to spread apart to an emptying position greater than said selected extended collection position to allow collected items to be emptied from the chamber between the coils; and
   (f) adjustment means on said push rod selectively positionable to establish the position of the spreader relative to the coil spring in said selected one of said plurality of extended collection position.

2. The manually operable collection device of claim 1 wherein said handle and push rod each have a cross member at their upper end.

3. The manually operable collection device of claim 1 wherein the spreader is generally cylindrical having a part of its outer surface engaging the coil spring.

4. The manually operable collection device of claim 1 wherein the handle is tubular and the push rod is reciprocable within said tubular handle.

5. The manually operable collection device of claim 1 wherein the adjustment means comprises a nut in threaded engagement with the push rod and axially adjustable to establish the position of the spreader relative to the coil spring in said selected one of said plurality of extended collection position.

6. The manually operable collection device of claim 1 wherein the adjustment means comprises a pin selectively positionable on said push rod to establish the position of the spreader relative to the coil spring in said selected one of said plurality of extended collection position.

* * * * *